UNITED STATES PATENT OFFICE.

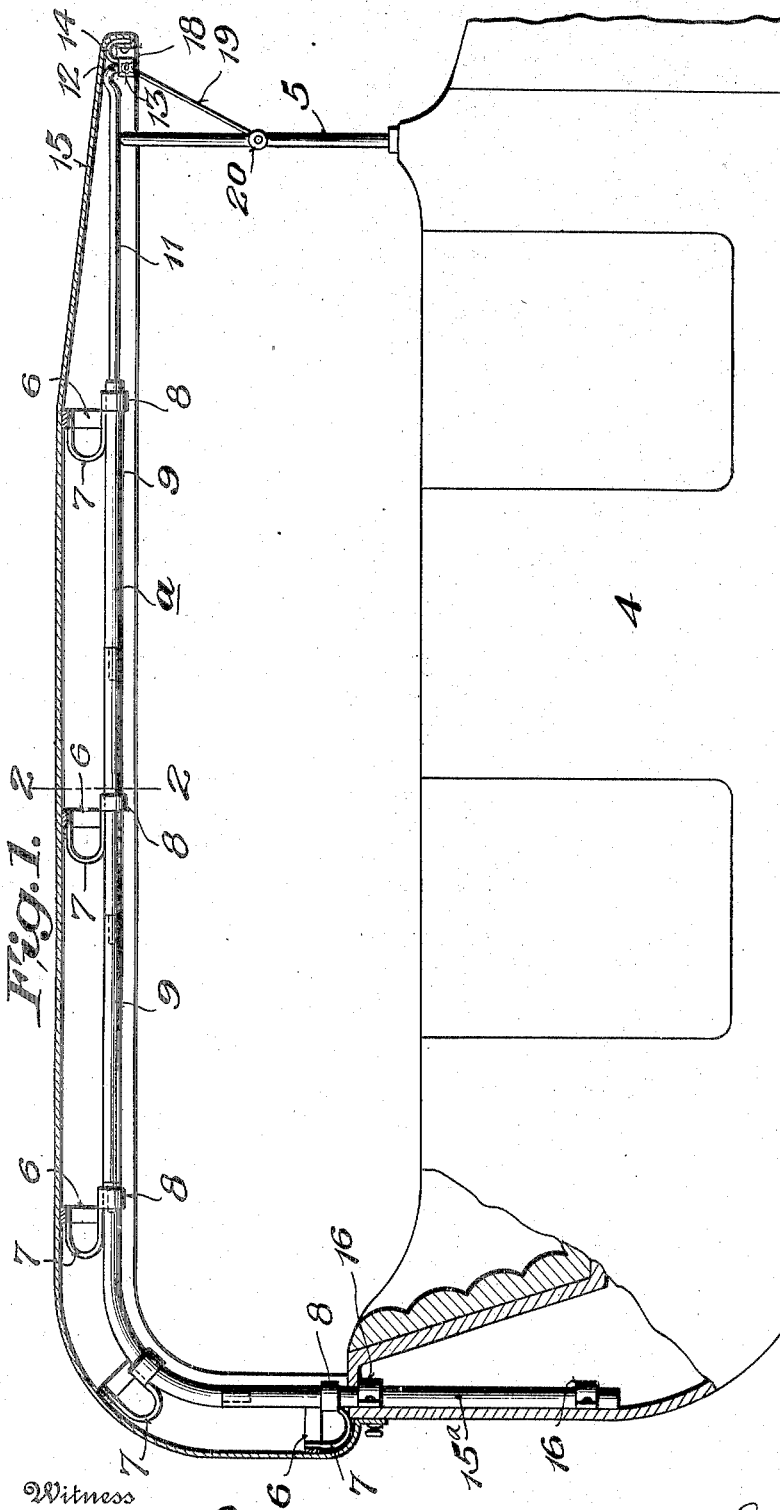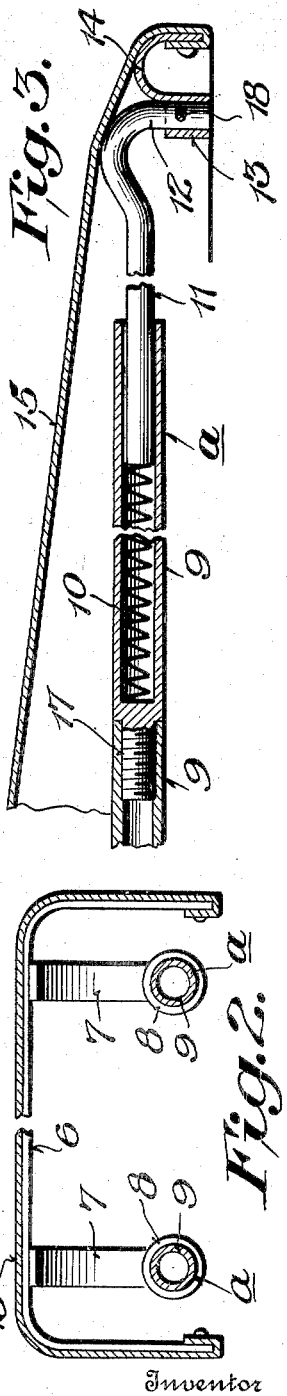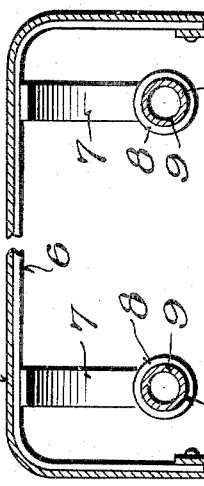

ABRAHAM D. HEDGES, OF LONG BEACH, CALIFORNIA.

AUTOMOBILE-TOP.

1,321,914.  Specification of Letters Patent.  Patented Nov. 18, 1919.

Application filed January 21, 1919. Serial No. 272,271.

*To all whom it may concern:*

Be it known that ABRAHAM D. HEDGES, a citizen of the United States, residing at Long Beach, in the county of Los Angeles and State of California, has invented certain new and useful Improvements in Automobile-Tops, of which the following is a specification.

This invention relates to automobile tops, and particularly to a particular form of top frame and to a covering therefor whereby the top frame may be readily mounted or dismounted, and wherein after dismounting the frame and permitting the same to remain in assembled condition the covering material may have sliding movement thereover and be forced backwardly to the rear of the vehicle, and there folded.

Another object is to provide a highly ornamental frame for vehicles which may remain stationary in its support over the vehicle body for the support of a covering which may be moved backwardly and forwardly over the frame without dismantling or raising or lowering the frame.

Another object of the invention resides in the provision of a rigid and highly ornamental top frame for high-class and other automobiles, embodying among other characteristics, a structure which may remain in "up" position at all times and the covering material of the top folded away therefrom on the back of the vehicle or drawn from folded position at the back of the vehicle to a position over the frame to cover the vehicle, and which frame has means connected therewith for automatically drawing forwardly upon the covering material to draw the same taut at all times, and thereby preventing the top covering from wrinkling or appearing out of shape when the top and its covering are in raised position.

With these and other objects in view, the invention consists in the construction and novel combination of parts hereinafter fully described and illustrated in the accompanying drawings and pointed out in the claims hereto appended, it being understood that various changes in the form, proportion, size and minor details of construction, within the scope of the appended claims, may be resorted to without departing from the spirit or sacrificing any of the advantages of the invention.

In the drawings:—

Figure 1 is a side elevation partly in section illustrating my invention.

Fig. 2 is a transverse sectional view.

Fig. 3 is a detail sectional view illustrating the means designed to automatically draw the covering and part of the top taut when the top and its covering are in raised position on the vehicle.

Referring now more particularly to the accompanying drawings, the reference character 4 indicates the body or any suitable type of a touring or other automobile or motor vehicle and which is shown as provided wth a wind shield 5. These two elements are immaterial, as far as the present invention is concerned. The body may be of any suitable character, as will be understood. The top frame, in this instance, consists of two side bars *a* and cross bows 6 which latter may be preferably spaced from the side bars *a* by means of suitable brackets preferably of U-shape, as indicated at 7, these brackets 7 being fixedly secured to the bows 6 at one end and at their other ends provided with sleeves 8 designed to have slidable movement on the side bars *a*.

The side bars *a* consist preferably of sections 9 and each has its forward section provided with a spring or other suitable resilient element 10 designed to normally expand and force outwardly from the front tubular section a rod 11 provided with a hooked part 12 adapted to fit in the corresponding socket 13 of an inverted U-shaped member 14 fixedly secured in any suitable manner to the front edge of the top covering 15, there being one of these inverted U-shaped members 14 provided with a socket 13 for each of the arms 11, there being as should be understood, one of these arms 11 provided with a hook 12 projecting from the front end of each of the side bars *a*. The side bar sections include a curved tubular section at the rear of the automobile as shown, and this curved tubular section is designed to connect the side bars *a* with the vertical posts 15 secured by suitable clamps 16 or otherwise at the corners of the rear of the body of the automobile.

The tubular sections of the side bars including the curved sections aforesaid and the posts 15$^a$ have detachable connection with one another and one form of detachable connection may consist of the screw threaded socket and tongue connection indicated clearly at 17 so that by a screwing together of the sections the top frame may be assembled or disassembled by an unscrewing of this screw connection 17, as should be well understood.

While my top frame is constructed so that it may be readily taken down if desired, it is the principal object of my invention to form this substantial and ornamental supporting frame to remain in "up" position so that when it is desired to shift the covering from raised position to "down" position at the rear of the vehicle it may be readily done without removing the frame work. To this end the bows 6 are spaced from the side bars of the supporting frame by the brackets 7 and it is for the reasons stated that I have the sleeves 8 of the brackets 7 slidable on the side bars $a$ so that by a release of the front end of the covering in a manner which will be explained the covering may be readily moved and guided on the side bars from its raised to its lowered position at the rear of the vehicle. To effect this disconnection of the cover 15 from the supporting frame to permit the cover to be folded back it is simply necessary to remove the hooked ends 12 of the arms 11 from the respective sockets 13 of the members 14 and this may be readily done by a disconnection of the fastenings 18 connected by straps or other suitable elements 19 with the wind shield at 20. When this disconnection of the hooked ends 12 from the respective sockets 13 is effected, it is a very easy matter for a driver or operator to move or pull the covering material 15 backwardly along the side bars $a$, serving as guides and the folds of the covering material 15 will be readily received in the U-shaped brackets 7 in their folded condition, as should be well understood, and in view of what has been stated herein, it is believed that further description and illustration is unnecessary.

What is claimed is:—

1. A device of the character described comprising a top frame including side rail sections detachably connected together, the outermost section of each rail being hollow, a cover slidable on the top frame, inverted U-shaped members secured to the front edge of the cover, each having an upwardly opening socket, a rod slidable in each of said hollow side rail sections and each provided at its outer end with a hook for detachable engagement in the corresponding socket of the aforesaid inverted U-shaped members, and means for fastening said hooks in said sockets against accidental disconnection.

2. A device of the character described comprising a top frame consisting of side bars and cross bows, means for supporting the bows slidably on the side bars, a covering connected to the cross bows, the covering carrying yieldably mounted sockets at its forward end, a spring actuated hook device carried by the side bars and engaged to hook in the sockets at the front end of the covering to draw upon and maintain the covering in taut position on the frame, the yieldably mounted sockets permitting the same to be readily engaged with and disengaged from the said hooks.

3. A device of the character described including a top frame, a covering having slidable connection with the top frame, whereby the covering may be folded at the rear of the vehicle without folding the frame, and a rod slidable longitudinally in the top frame and held against upward and downward movement and provided with means for adjustably engaging the cover, and yieldable means for forcing the said rod outwardly to draw upon the cover to hold the same taut upon the supporting frame when the cover is drawn to covering position over the frame.

4. A device of the character specified for the covering of an automobile body including a top frame, a covering slidably mounted on the top frame and provided at the front with a socket having a substantially U-shaped yieldable member connecting the socket with a covering, a rod slidable longitudinally in the top frame and provided with means for engaging the said socket, and a spring for urging the rod outwardly to maintain the covering in a taut condition, said covering being slidable over the frame and foldable at the rear of the vehicle while the frame remains in upright position.

5. A device of the character described comprising a top frame including side rail sections detachably connected together, the outermost section of each rail being hollow, a cover slidable on the top frame, inverted U-shaped members secured to the front edge of the cover, each having an upwardly opening socket, a rod slidable in each of said hollow side rail sections and each provided at its outer end with a hook for detachable engagement in the corresponding socket of the aforesaid inverted U-shaped members, means for fastening said hooks in said sockets against accidental disconnection, and a spring in each hollow frame section exerting pressure against the inner ends of the rods slidable therein to draw upon the cover to hold the latter taut.

In testimony whereof I affix my signature.

ABRAHAM D. HEDGES.